(12) United States Patent
Piel et al.

(10) Patent No.: US 10,031,862 B2
(45) Date of Patent: Jul. 24, 2018

(54) MEMORY PROTECTION UNIT, MEMORY MANAGEMENT UNIT, AND MICROCONTROLLER

(71) Applicant: Robert Bosch GmbH, Stuttgart (DE)

(72) Inventors: Gunnar Piel, Hemmingen (DE); Nico Bannow, Stuttgart (DE); Simon Hufnagel, Herrieden (DE); Jens Gladigau, Stuttgart (DE); Rakshith Amarnath, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 168 days.

(21) Appl. No.: 15/176,696

(22) Filed: Jun. 8, 2016

(65) Prior Publication Data
US 2016/0364342 A1  Dec. 15, 2016

(30) Foreign Application Priority Data

Jun. 9, 2015 (DE) .......................... 10 2015 210 539

(51) Int. Cl.
*G06F 12/14* (2006.01)
*G06F 9/455* (2018.01)
*G06F 13/40* (2006.01)

(52) U.S. Cl.
CPC ........ *G06F 12/145* (2013.01); *G06F 9/45558* (2013.01); *G06F 13/4022* (2013.01); *G06F 2009/45583* (2013.01); *G06F 2212/1052* (2013.01)

(58) Field of Classification Search
None
See application file for complete search history.

(56) References Cited

U.S. PATENT DOCUMENTS

| 9,318,167 | B2 * | 4/2016 | Ito | G11C 7/1036 |
| 9,566,158 | B2 * | 2/2017 | Datta | G06F 21/53 |
| 2007/0250675 | A1 * | 10/2007 | Ono | G06F 12/1441 711/163 |
| 2012/0198206 | A1 * | 8/2012 | Park | G06F 12/1441 711/206 |
| 2015/0242233 | A1 * | 8/2015 | Brewerton | G06F 9/30043 710/308 |
| 2015/0254017 | A1 * | 9/2015 | Soja | G06F 3/0622 711/103 |
| 2017/0032119 | A1 * | 2/2017 | Dore | G06F 21/53 |
| 2017/0039085 | A1 * | 2/2017 | Meriac | G06F 21/74 |

FOREIGN PATENT DOCUMENTS

DE  19828056 A1  12/1999

* cited by examiner

*Primary Examiner* — Kaushikkumar Patel
(74) *Attorney, Agent, or Firm* — Norton Rose Fulbright US LLP; Gerard Messina

(57) ABSTRACT

A memory protection unit including hardware registers for entering address tables, a configuration memory for storing the address tables, a preconfigured hardware logic for managing the configuration memory, a data connection between the configuration memory and the hardware logic for loading the hardware registers, a first interface for controlling the loading by a computing core, and a second interface for writing to the configuration memory by the computing core.

10 Claims, 3 Drawing Sheets

MEMORY PROTECTION UNIT, MEMORY MANAGEMENT UNIT, AND MICROCONTROLLER

CROSS REFERENCE

The present application claims the benefit under 35 U.S.C. § 119 of German Patent Application No. DE 102015210539.3 filed on Jun. 9, 2015, which is expressly incorporated herein by reference in its entirety.

FIELD

The present invention relates to a memory protection unit. The present invention also relates to a corresponding memory management unit and to a corresponding microcontroller.

BACKGROUND INFORMATION

The hypervisor (virtual machine monitor, VMM) forms an important basic concept of virtualization. From the point of view of software, the VMM ensures that different independent software units can be completely separated from one another. This so-called freedom from interference is useful in particular insecurity-critical use cases. Larger software units, for example applications including operating systems, are in the following referred to as virtual machines (VMs). Smaller software units (software entities, SWEs) are for example operating system tasks, software threads, or parts of the user software inside a VM. The hierarchical subdivision of VMs and SWEs can be realized in actual hierarchical fashion in the execution, or through a flat partitioning of a large number of SWEs having only a logical allocation to VMs. For an efficient virtualization, a microcontroller or microprocessor according to the existing art has specific hardware capabilities in order to be able to separate the VMs from one another.

A core module of the virtualization within a microcontroller or microprocessor (μP)—in the following referred to for short as μC—is the memory protection unit (MPU). In general, the MPU can be freestanding, or can be integrated within a memory management unit (MMU). The main computing core MPU checks the memory accesses of the main computing cores of a μC for possible access infringements. The IO-MMU checks the memory accesses of the DMA-capable or master-capable peripheral units of a μC for possible access infringements. The main computing core MPU and the IO-MPU are referred to in the following simply as MPU. The DMA-capable or master-capable peripheral units are in the following designated, together with the main computing cores, as computing cores. An access infringement is for example a write access by a VM to a memory address that is assigned to a different VM. For this purpose, on the basis of address tables it is checked whether the addresses connected with the individual accesses are within the allowed regions. Typically, different address regions are defined for different VMs. For example, for 5 VMs and, respectively, 10 address regions, a total of 5×10=50 address regions are to be defined. A typical computing system is made up of one or more computing cores and for example flash memories or RAMs, connected among one another via a bus or crossbar switch. An MPU is a hardware unit that is situated for example between a computing core and a bus or crossbar switch. The MPU stores the address regions and contains comparator units that check each access of the computing core to the memory, via the bus or the crossbar switch, for permissibility before its execution. If the access is permitted, it takes place. If an access is not permitted, it is prevented and therefore does not reach the bus, and the computing core is suitably informed, for example through an interrupt.

German Patent Application No. DE19828056 A1 relates to a system for monitoring memory regions of a memory during a write process of the memory within a program sequence. It is provided that an auxiliary memory is assigned to the memory, which auxiliary memory is structured during the application of memory regions of the memory in such a way that memory regions of the memory that are to be protected are each assigned identified memory regions of the auxiliary memory, and when the program is executed the memory regions of the memory and the identified memory regions of the auxiliary memory can be addressed at the same time, and when there is unauthorized addressing of an identified memory region of the auxiliary memory the program sequence is influenced.

SUMMARY

The present invention provides a memory protection unit, a corresponding memory management unit, and a corresponding microcontroller.

The more intensively access is made to the specific hardware capacities of a μC for virtualization, the more important its efficiency, or speed of execution, is. In the least favorable case, the use of a VMM produces a runtime access outlay that is so high that the overall computing power massively collapses. A specific embodiment of the present invention therefore offers hardware support for virtualization whose performance requirement is minimal even given intensive usage.

An advantage of this solution is the acceleration of the necessary changeover of an MPU for the execution of VMs and SWEs, whose memory regions are separated from one another in order to achieve freedom from interference. The goal of this approach is, in particular, a minimum time requirement for the loading of the address regions of the MPU that are to be protected. This faster changeover then as an advantageous effect, e.g., on the efficiency of the virtualization, in particular through the changeover of VMs through the VMM. The faster changeover however for example is also advantageous for normal operating systems or applications in the separation of individual threads, in particular through the changeover of individual SWEs.

Because the computing core no longer itself has to partly or completely (re-)configure the MPU register, during the MPU-internal reconfiguration it can also carry out, parallel thereto, calculations on the local memory.

A specific embodiment of the present invention provides further flexibility in the management of the address regions for the mutual protection of software, using hardware support.

In accordance with the present invention, the configuration memory includes a static RAM (SRAM) for storing the address tables of the memory protection unit. Because the clock frequency is technologically limited, in order to achieve a high transmission bandwidth of the configuration memory it is also possible to use a high data word width in order to enable a fast reconfiguration of the address regions. Through the chip-internal memory, connected directly to the MMU, here data word widths of 256 bits or greater are uncritical.

According to a further aspect, shadow registers can be provided. Through the use of two or more such MPU register sets, which can be preloaded explicitly by the software or by a hardware prediction logic, the changeover of the registers can be buffered and thus can take place even faster.

According to a further aspect, the hardware logic can be configured such that it can distinguish software units having the same or different level of execution based on an unambiguous software identifier. Using such an ID or access level, transfers of a suitable peripheral unit with the aid of the memory protection unit can be checked for validity.

According to a further aspect, in this way the hardware logic can be configured such that an automatic or partly automatic loading of the hardware register takes place on the basis of the respectively active software with its unambiguous software identifier, so that no action, or only a limited action, of the computing core (23) is required. In this way, the memory protection unit can automatically (and quickly) load the fitting address regions into its register, on the basis of the software identifier. This measure takes into account the circumstance that registers are often strongly limited, memory is relatively inexpensive, and a change in the software identifier takes place significantly less often than accesses by the computing core via the bus. The proposed approach then means a clear increase in the possible configured memory regions that is transparent for software and low in cost.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
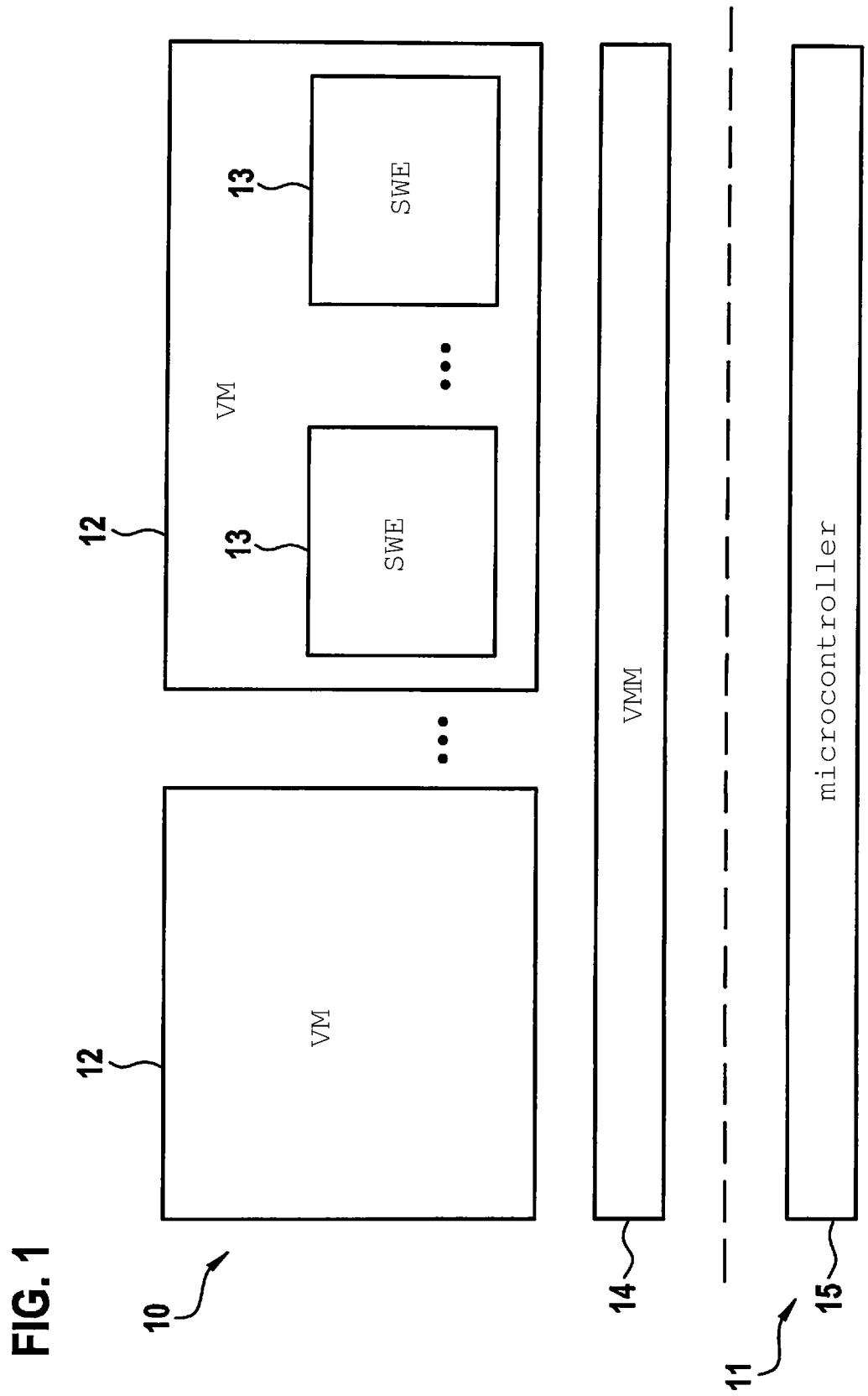
FIG. 1 shows the schematic classification of concepts used into software and hardware.

An example of use scenario includes a hardware unit 11 in the form of a microprocessor or microcontroller 15 that executes a piece of software 10. Software 10 includes a VMM 14 that can monitor a plurality of VMs 12, where a VM 12 can in turn have a plurality of SWEs 13. These relationships are summarized in FIG. 1.

Figure 2:
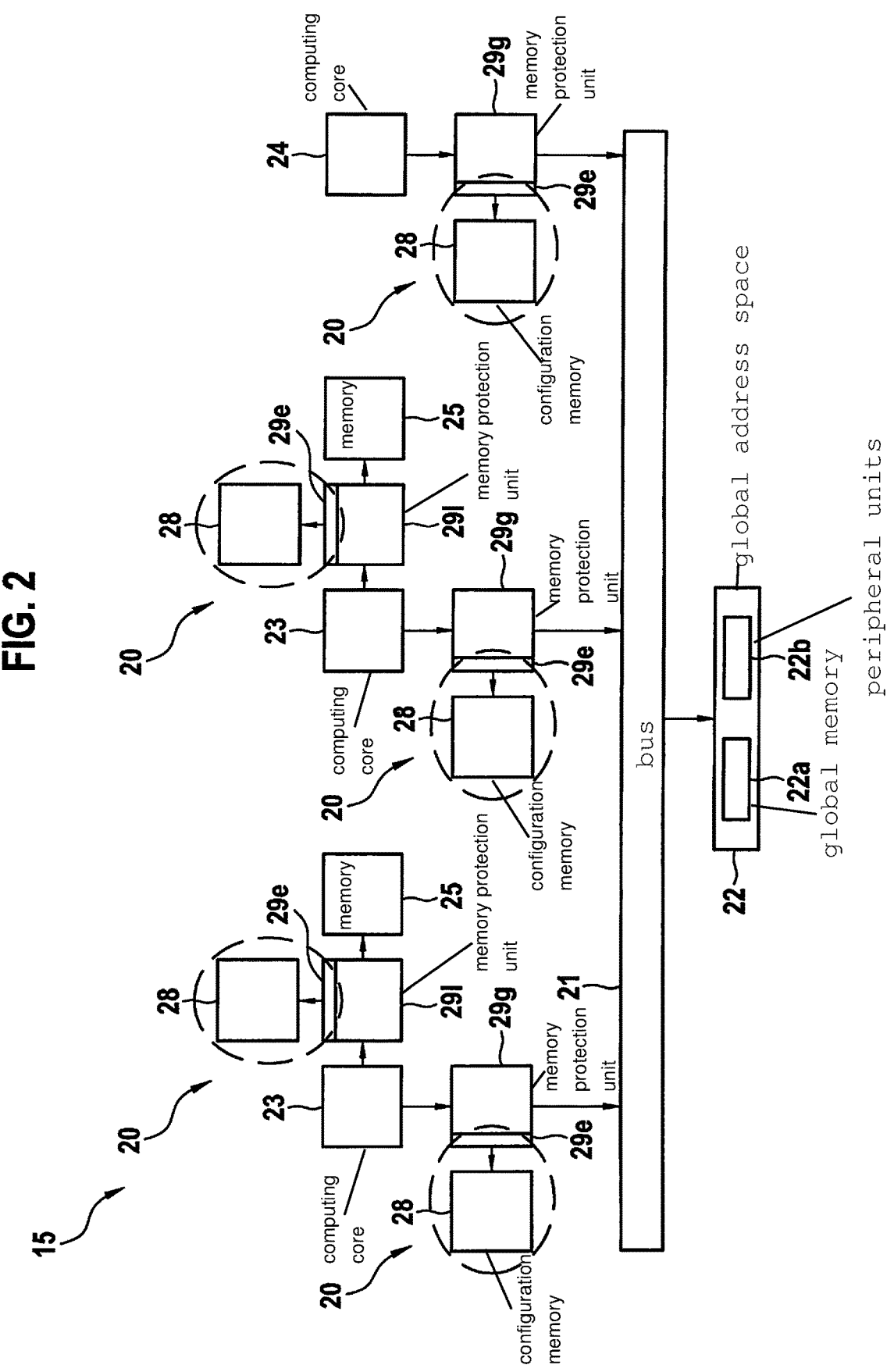
FIG. 2 shows the design of a μC having a local MPU configuration memory according to a specific embodiment.

FIG. 2 shows further details of the design of microcontroller 15. This microcontroller includes in particular a bus 21 having a crossbar switch for reading and writing working data from a global address space 22 made up of global memory 22a and globally accessible peripheral units 22b that are accessible via global address space 22, three computing cores 23, 24 indirectly connected to bus 21, core 23 being a main computing core and 24 being a DMA-capable peripheral unit, each for processing the working data, two local working memories 25, each connected indirectly to one of the main computing cores 23, for storing local working data, two first memory protection units 29l connected between each of the two main computing cores 23 and the respective local working memory 25, for protecting local working memories 25, three second memory protection units 29g, respectively connected between one of the three computing cores 23, 24 and bus 21, for protecting global address space 22 having global memory 22a and global peripheral units 22b, as well as a respective configuration memory 28 connected to each of the memory protection units 29l, 29g, in which configuration memory the configuration of the memory regions to be protected is stored, and a respective expansion 29e of memory protection units 29l, 29g by an access interface in order to enable access to configuration memory 28; here 20 represents, as the sum of 29e and 28, one innovation according to the present invention.

The content of the hardware register for the changeover of memory protection units 29l, 29g is here not stored for example in the main memory of microcontroller 15. Instead, memory protection units 29l, 29g each have their own local configuration memory 28, preferably in the form of a static RAM, a hardware logic 29e contained in memory protection unit 29l, 29g for managing configuration memory 28, a high-performance data connection and a control logic between configuration memory 28 and hardware logic 29l, 29g—in particular between configuration memory 28 and the hardware registers of 29l, 29g, which contain the address regions that are to be checked—for the exchange of data between configuration memory 28 and the hardware registers, an interface between memory protection unit 29l, 29g and the respective computing core 23, 24 for controlling the matching between configuration memory 28 and hardware registers, and an interface between memory protection unit 29l, 29g and the respective computing core 23, 24 for writing to configuration memory 28 through computing core 23, 24 by way of a direct data transmission, or indirectly after pre-processing by memory protection unit 29l, 29g.

Optionally, memory protection units 29l, 29g have a logic system for hierarchical separation between different access levels, e.g., for the purpose of distinguishing VMM 14, VM 12, or SWEs 13, and control the automatic loading of the desired MPU configuration on the basis of the access levels or an identifier (ID) of the software 10 being executed, e.g., a VM ID in the case of VMs, or a thread ID in the case of SWEs.

During the regular execution of an active VM, each memory protection unit 29l, 29g functions in the conventional manner: the current address table, having a determined number of address regions, is located in the hardware registers of memory protection unit 29l, 29g. Each address access of the respective computing core 23, 24 is checked for access authorization by checking this address against each address region from the address table of memory protection unit 29l, 29g. In order to enable a fast check, all the checks are preferably carried out in parallel hardware structures, e.g. by providing for each address region a comparator for the lower bound and a comparator for the upper bound.

If, however, a software unit, e.g., a VM, is switched over, according to the present invention it is no longer necessary for software 10 to explicitly reload each hardware register for writing to the address regions individually or block-by-block into memory protection unit 29l, 29g. Instead, the address regions are read out by hardware logic 29e from local configuration memory 28 of memory protection unit 29l, 29g. Configuration memory 28 is preferably a fast SRAM. For the changeover, software 10 merely has to initiate memory protection unit 29l, 29g. This can take place for example by indicating addresses within configuration memory 28 or by communicating an ID at which the new configuration data are stored. The initiation can take place explicitly through the respective computing core 23, 24, or implicitly through the memory accesses of a particular VMM/VM/SWE, to which an unambiguous ID or access level can be assigned.

In order to configure the address regions initially or at runtime, depending on the embodiment each of the computing cores 23, 24, or only one of these computing cores, can directly or indirectly access, via the hardware registers of the memory protection units 29l, 29g, their own, or all, configuration memories 28 of memory protection units 29l, 29g, i.e., the address regions that are to be protected.

If, in the later working sequence, the memory accesses of DMA-capable peripheral unit 24 are set, then an ID or access level, communicated implicitly if warranted or to be communicated explicitly, of the setting VMM/VM/SWE of main computing core 23 is preferably also to be stored in DMA-capable peripheral unit 24, but not in configuration memory 28. In the later sequence, each of the memory accesses of DMA-capable peripheral unit 24 can then be provided with a corresponding ID or access level. The ID or access level is oriented according to which VMM/VM/SWE of computing core 23, 24 has set the respective transfer. Using the ID or access level, transfers of DMA-capable peripheral unit 24 can be checked for validity with the aid of memory protection unit 29g, and here again with the aid of the address data of configuration memory 28.

Depending on the execution level of active software 10, accesses of the executing main computing core 23 to the configuration of memory protection unit 29l, 29g can be permitted or prevented.

Memory protection units 29l, 29g can load address tables—explicitly and/or implicitly/automatically on the basis of an SW ID or a privilege level—according to the following options:

In particular if the relevant memory protection unit 29l, 29g is "flat" and distinguishes only between VMs: software 10 can explicitly set the beginning of an address table for the VMs at memory protection unit 29l, 29g. For this purpose, pointing takes place to the first and to the last entry within the memory region of memory protection unit 29l, 29g, by index or by address directly, or indirectly by offset.

In particular if the relevant memory protection unit 29l, 29g is hierarchical and distinguishes between VMs and SWEs: software 10 can then point directly, or indirectly by offset, to the entry of the relevant SWE by index or by address.

From this information, stored in configuration memory 28 or in the hardware registers of the relevant memory protection unit 29l, 29g, the entry to the address spaces allowable for the respectively executed VMs or SWEs can then be derived.

According to an optional safety feature, it is provided to write all possible configurations for memory protection unit 29l, 29g in a startup phase, and then to offer further modification possibilities during operation. Memory protection unit 29l, 29g then has a configuration mode, and subsequently runs in autarkic fashion without further interaction.

Preferably, the number of SWEs within a VM is not defined, but rather can be chosen flexibly. The maximum number of address regions that can be simultaneously checked could also be limited by the limited number of hardware comparators in a corresponding specific embodiment.

In a specific embodiment that takes the hierarchy into account, memory protection unit 29l, 29g ensures that software 10 having an execution level does not modify or read the configuration of a separate piece of software 10 having the same, or higher-privileged, execution level. The configured address regions of VMM, various VMs, and SWEs among one another are thus to a certain extent invisible.

In this case, a higher-order software 10 should be permitted to have full access to the configuration of the address regions of all lower-order software units 10—in particular, VMM 14 to VMs 12 and SWEs 13, as well as VMs 12 to SWEs 13.

Through the use of two or more sets of hardware registers corresponding to the shadow registers or shadow sets known from the existing art—which can be preloaded explicitly by software 10 or also heuristically by a predictive logic system of hardware 11 (prefetching), the changeover of the hardware registers can be buffered and in this way can take place even faster.

If configuration memory 28 is not adequate for all the VMs and SWEs, the configurations can also be stored in local memory 25 of computing core 23 or in global memory region 22a, and as needed can be copied back and forth between these memories and configuration memory 28 connected to memory protection units 29l, 29g. For accesses to global memory region 22a, either computing core 23, 24 or a DMA controller can be used, or memory protection unit 29l, 29g can directly access this memory 22a, if a corresponding access logic system is present, via bus 21.

If the hierarchy is taken into account, then, in configuring a hierarchy level, the maximum number of entries in a lower hierarchy level can be defined. For example, within a VM 12 the actual number of SWEs 13 at runtime should be capable of being freely set. This can also take place dynamically, capped by limited resources of hardware 11 if warranted.

Figure 3:
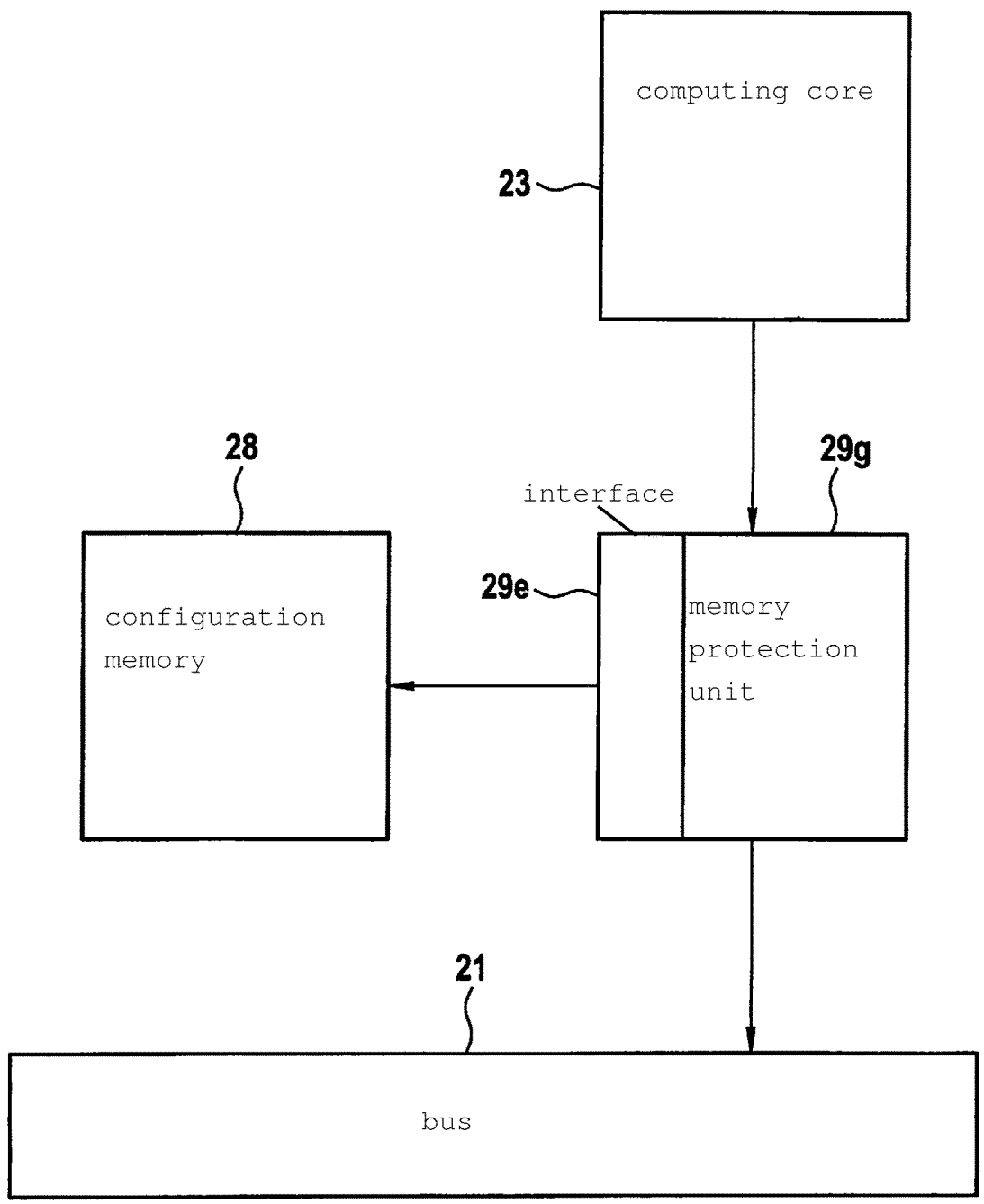
FIG. 3 shows an example of use of a specific embodiment of the present invention.

FIG. 3 illustrates an example for the use of a specific embodiment of the present invention. The first step here is formed by an initialization that can take place at startup, but can also take place dynamically at runtime. In this step, computing core 23 sends one or more address regions to memory protection unit 29g. Memory protection unit 29g stores these address regions via interface 29e in connected configuration memory 28.

The second step of this use is formed by activation during operation. Computing core 23 explicitly or implicitly communicates to memory protection unit 29g address regions that are to be activated in this step. This communication can take place using an index, a software ID, a privilege level, or a pointer to configuration memory 28, and can include one or more address regions. Memory protection unit 29g can, activated by computing core 23 or on its own, discard a part of the old address regions if these are no longer valid, or store them if they remain valid. Memory protection unit 29g now loads the new valid address regions from configuration memory 28 into the local hardware registers.

In the third step, memory protection unit 29g goes over into normal operation. Computing core 23 here accesses memory regions through an addressing, and memory protection unit 29g checks the address used by computing core 23 for allowability. If allowability is present, the access is forwarded to bus 21; otherwise it is blocked.

What is claimed is:
1. A memory protection unit, comprising:
  hardware registers for entering address tables;
  a configuration memory for storing the address tables;
  a preconfigured hardware logic for managing the configuration memory;
  a data connection between the configuration memory and the hardware logic for loading the hardware registers;
  a first interface for controlling the loading by a computing core; and
  a second interface for writing to the configuration memory by the computing core.

2. The memory protection unit as recited in claim 1, wherein the hardware logic is set up to monitor an access during loading of the hardware registers.

3. The memory protection unit as recited in claim 2, wherein the hardware logic is configured such that the loading of the hardware registers takes place as a function of an execution level in an access hierarchy.

4. The memory protection unit as recited in claim 3, wherein the hardware logic is configured such that the execution level is determined as a function of a software identifier.

5. The memory protection unit as recited in claim 4, wherein the hardware logic is configured such that the software identifier designates a virtual machine monitor (VMM), a virtual machine (VM), or a software entity (SWE).

6. The memory protection unit as recited in claim 5, wherein the hardware logic is configured such that on the basis of the software identifier, the hardware logic can distinguish VMs of the same and different execution level, and SWEs of the same and different execution level.

7. The memory protection unit as recited in claim 6, wherein the hardware logic is configured such that an automatic or partly automatic loading of the hardware registers takes place on based on a respectively active software having the software identifier designating the software.

8. A memory management unit having a memory protection unit, the memory protection unit comprising:
hardware registers for entering address tables;
a configuration memory for storing the address tables;
a preconfigured hardware logic for managing the configuration memory;
a data connection between the configuration memory and the hardware logic for loading the hardware registers;
a first interface for controlling the loading by a computing core; and
a second interface for writing to the configuration memory by the computing core.

9. A microcontroller having a memory protection unit, the memory protection unit comprising:
hardware registers for entering address tables;
a configuration memory for storing the address tables;
a preconfigured hardware logic for managing the configuration memory;
a data connection between the configuration memory and the hardware logic for loading the hardware registers;
a first interface for controlling the loading by a computing core; and
a second interface for writing to the configuration memory by the computing core.

10. A microcontroller, comprising:
a bus having a crossbar switch for exchanging working data with a global address space;
computing cores indirectly connected to the bus for processing the working data; and
memory protection units, connected between a respective one of the computing cores and the bus, for protecting the global address space, the memory production units including:
hardware registers for entering address tables,
a configuration memory for storing the address tables,
a preconfigured hardware logic for managing the configuration memory,
a data connection between the configuration memory and the hardware logic for loading the hardware registers,
a first interface for controlling the loading by a computing core, and
a second interface for writing to the configuration memory by the computing core.

* * * * *